(12) United States Patent
Tovar

(10) Patent No.: US 7,667,188 B2
(45) Date of Patent: Feb. 23, 2010

(54) POSITION MEASURING DEVICE INCLUDING A SCALE HAVING AN INTEGRATED REFERENCE MARKING

(75) Inventor: Heinz Tovar, Siegsdorf (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 3 days.

(21) Appl. No.: 12/120,126

(22) Filed: May 13, 2008

(65) Prior Publication Data

US 2008/0290262 A1 Nov. 27, 2008

(30) Foreign Application Priority Data

May 25, 2007 (DE) .................. 10 2007 024 593

(51) Int. Cl.
*G01D 5/34* (2006.01)
*G01J 9/00* (2006.01)
*H03M 1/22* (2006.01)

(52) U.S. Cl. ................ 250/231.13; 250/231.17; 341/13

(58) Field of Classification Search ..............................
250/231.13–231.18, 237 G, 237 R; 356/616;
33/706, 707, 710; 324/207.24, 207.25; 341/9–11,
341/13
See application file for complete search history.

(56) References Cited

U.S. PATENT DOCUMENTS 6,995,840 B2 * 2/2006 Hagler .................. 356/310
2004/0218190 A1 11/2004 Holzapfel

FOREIGN PATENT DOCUMENTS

DE 103 19 609 11/2004
EP 1 400 778 3/2004

* cited by examiner

*Primary Examiner*—Thanh X Luu
(74) *Attorney, Agent, or Firm*—Kenyon & Kenyon LLP

(57) ABSTRACT

A scale and a position-measuring device include the shifting of reference markings in graduation tracks, offset transversely with respect to the measuring direction, by fractions of the interval of the reference markings within a graduation track. It is thus possible to eliminate, or at least to markedly reduce, negative effects of the disturbance of the periodicity of a graduation track by the reference markings.

13 Claims, 5 Drawing Sheets

FIG. 1
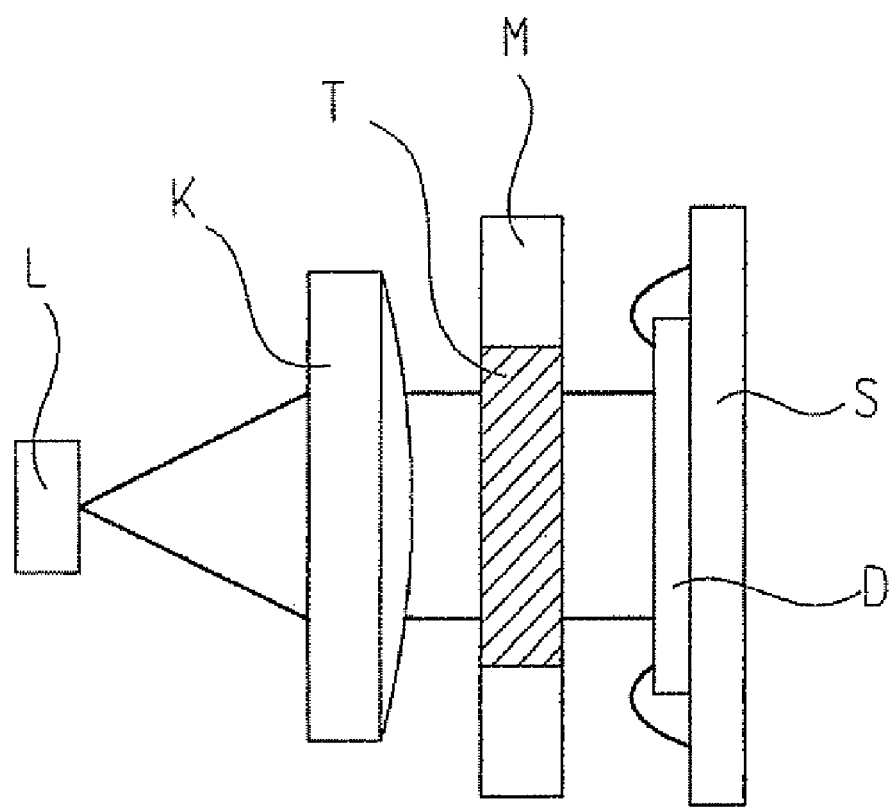
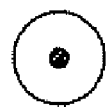
X

PRIOR ART

POSITION MEASURING DEVICE INCLUDING A SCALE HAVING AN INTEGRATED REFERENCE MARKING

CROSS-REFERENCE TO RELATED APPLICATIONS

The present application claims priority to Application No. 10 2007 024 593.0, filed in the Federal Republic of Germany on May 25, 2007, which is expressly incorporated herein in its entirety by reference thereto.

FIELD OF THE INVENTION

The present invention relates to a scale for a position-measuring device and to a position-measuring device having such a scale.

BACKGROUND INFORMATION

Certain position-measuring devices or position-measuring instruments for linear or angle measurements based on scales having high-precision periodic graduation tracks are conventional. They are used in many types of machines to position axes with the aid of a drive. Examples for such machines are machine tools having three or more movable axes for positioning a tool and a workpiece relative to each other in accordance with an NC program, as well as pick-and-place machines or devices for processing wafers in electronics manufacturing.

In general, there is a trend toward increasingly higher demands on the accuracy of such machines, and therefore the demands on the position-measuring devices are tending to rise. Position measurements are already being performed in the nanometer range using scale-based position-measuring instruments rather than interferometers, which have traditionally been used in such range.

The scales of such position-measuring instruments usually have a periodic graduation track which is scanned by a detector of the position-measuring instrument. In so doing, periodic electrical signals, out of phase relative to each other, are generated, from which a shift is able to be ascertained, e.g., in a conventional manner, according to amount and direction.

Since, in addition to the shift in a measuring direction, the absolute position of the axis to be measured is often needed as well (e.g., for the commutation of a motor), absolute position-measuring instruments which are able to output a valid position immediately after being switched on are gaining increasing acceptance compared to incremental position-measuring instruments, which must first be brought into a reference position.

In addition to a very fine periodic incremental track, absolute position-measuring instruments include further tracks which permit the determination of an absolute position.

European Published Patent Application No. 1 400 778 describes that it is desirable to integrate reference markings at regular intervals into the incremental track having a small period. A second incremental track having a somewhat larger period is superimposed on the incremental track having a small period. In this manner, the assignment of an absolute track (the code connection) extending parallel to the incremental track is simplified considerably, and the susceptibility of the position-measuring instrument to moiré errors upon attachment is reduced.

According to European Published Patent Application No. 1 400 778, it is proposed that, in an incremental graduation structure made up of alternating light and dark regions, to replace one light (or dark) region by one dark (or light) region at regular intervals, e.g., by darkening an actually transparent region of a transmitted-light scale. This interruption of the periodicity of the incremental track is performed in each eighth period, and is therefore also referred to as a 1-out-of-8 gap.

Such a gap has an effect on the incremental signal similar to a periodic soiling of the scale. During the scanning of such a scale by a patterned photodetector having numerous sensor fields, which detects many periods of the scale simultaneously, such a disturbance of the periodicity at regular intervals does not impair the measurement so long as the scale and detector are optimally aligned relative to each other. However, if, for example, the illuminating optics do not supply an ideally parallel ray trajectory, or the photodetector is shifted radially in the case of circle graduations, then the image of the incremental track on the photodetector does not have the same graduation period as the photodetector. The image is either too large or too small, and a phase shift comes about from the middle of the sensor up to the two ends of the sensor field in the measuring direction. This phase shift is offset so long as, for a respective sensor on the one half of the scanning field, a sensor disposed in mirror symmetry with respect to the sensor middle can always be found on the other half. For example, these two sensors exhibit the same amount of phase shift, but an opposite operational sign. However, this is no longer the case when a soiling or simply a 1-out-of-8 gap extends through the sensor field. Individual sensors are covered, and the phase-angle error of the sensor thus not compensated for becomes effective. When forming a position value from the electrical signals of the photodetector, deviations thus result between the measured and the actual position value, and thus measurement inaccuracies arise.

SUMMARY

Example embodiments of the present invention provide a scale having integrated reference markings which still permits the formation of exact position values, even if a position-measuring device is not optimally aligned.

Example embodiments of the present invention provide a position-measuring device which is able to evaluate a scale such that the formation of exact position values is possible even if the position-measuring device is not optimally aligned.

A scale is provided for a position-measuring device, the scale bearing a graduation track that is P-periodic in the measuring direction and has an integrated reference marking in the form of an interruption of the P-periodicity at evenly spaced first intervals. Furthermore, the scale bears at least two such P-periodic graduation tracks which are offset transversely with respect to the measuring direction and whose integrated reference markings are offset relative to each other in the measuring direction.

Transversely to the measuring direction, the scale may include two P-periodic graduation tracks having reference markings staggered by half of the first interval in the measuring direction.

The graduation tracks may include light and dark regions alternating in the measuring direction, each period may be formed by one light region and one dark region, and each nth (e.g., each eighth) light or dark region in each graduation track may be replaced by an opposite dark or light region to form an integrated reference marking. Thus, the first interval may correspond to an eightfold of the period.

A position-measuring device which uses such a scale has a patterned detector for scanning the scale in order to generate electrical signals for forming a position value. The detector for scanning the graduation tracks has a plurality of detector tracks, offset transversely with respect to the measuring direction, which for a plurality of periods of the graduation tracks, in each case have m (e.g., m=4) sensors per period disposed one after the other in the measuring direction.

The evenly spaced reference markings are arranged in graduation tracks disposed transversely to the measuring direction, in a manner offset relative to each other in the measuring direction. It may be that measuring errors will result during the evaluation of the individual graduation tracks. However, given suitable correlation of the two ascertained position values, they cancel each other out. In order to intensify this effect, the detector tracks for scanning the graduation tracks are also suitably formed by the omission of specific sensors at a second interval which is different from a first interval of the reference markings.

At the second interval, each detector track may have a gap in which, in each case, m (e.g., m=4) sensors are one of (a) missing and (b) not utilized to generate the electrical signals.

The first interval and the second interval may differ by one period.

The gaps of the detector tracks may be arranged next to one another.

The sensors may include photodetectors, and each group of four photodetectors arranged one after another in the measuring direction may be arranged to scan one period of a graduation track.

Light from a light source, after being collimated, may pass through the scale onto the patterned detector.

Photodetectors arranged adjacent each other may be interconnected to detect the graduation tracks, photodetectors arranged offset relative to each other in the measuring direction may be interconnected to detect the integrated reference markings, and the offset of the photodetectors may correspond to the offset of the integrated reference markings between the graduation tracks.

The position-measuring device may include a light source and a collimator configured to collimate light from the light source and direct the collimate light through the scale on the patterned detector.

Further features and aspects of example embodiments of the present invention are described in more detail below with reference to the appended Figures.

BRIEF DESCRIPTION OF THE DRAWINGS

FIG. 1 schematically illustrates a position-measuring device.

DETAILED DESCRIPTION

Figure 2:
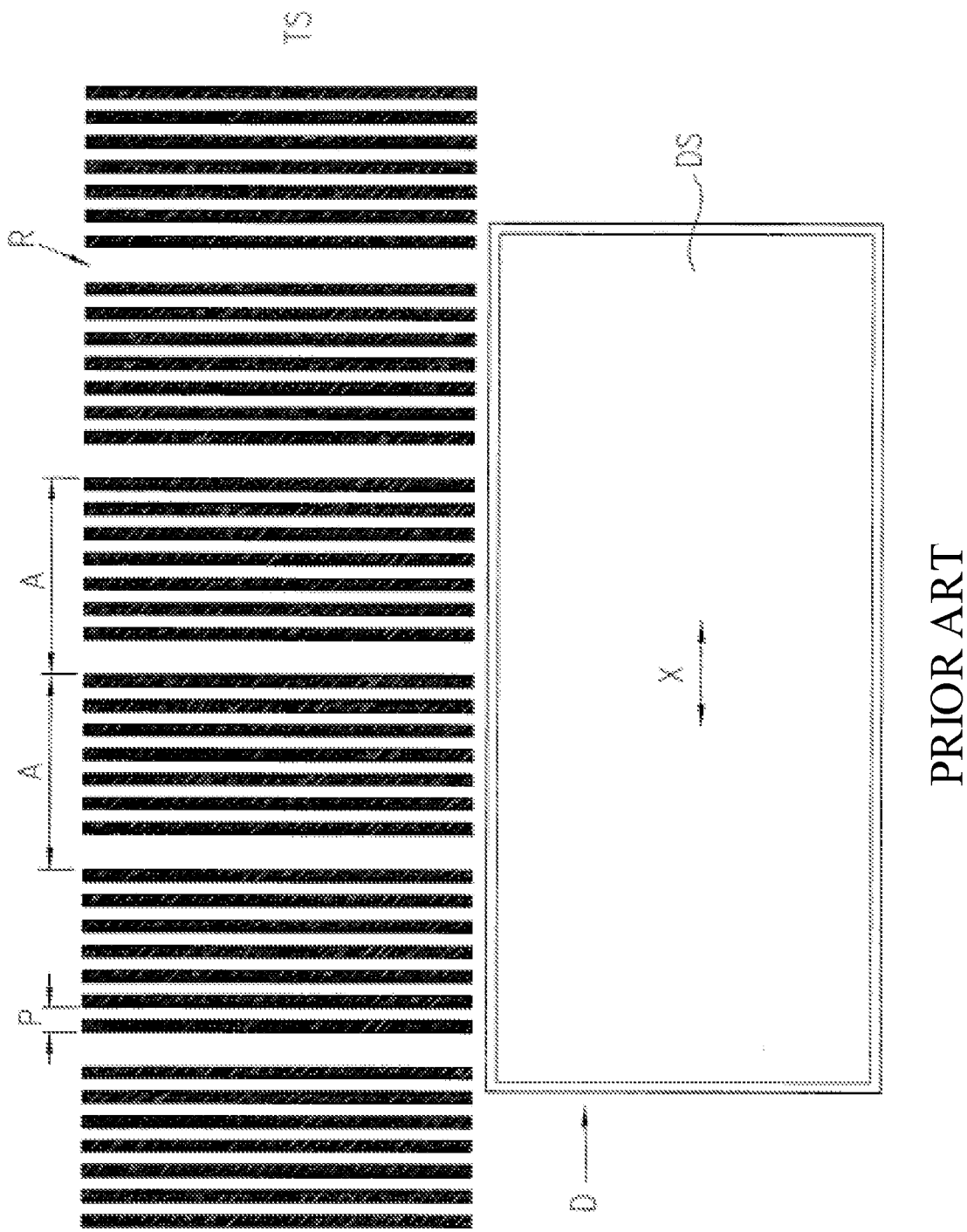
FIG. 2 shows a scale with an associated detector field according to a conventional arrangement.

FIG. 1 schematically illustrates a position-measuring device. A light source L illuminates a scale M with parallel light via a collimator lens K. Scale M bears an incremental graduation T. Measuring direction X is perpendicular to the drawing plane. The light passes through scale M and its alternating transparent and opaque structures, and in so doing, images graduation track T onto a patterned detector D arranged on a substrate S and having a plurality of sensors or photodetectors disposed one after the other in the measuring direction. If scale M moves relative to detector D, the individual sensors of detector D generate periodic signals which, e.g., in a conventional manner, are able to be converted into a position signal.

The upper half of FIG. 2 is a top view of an incremental, P-periodic graduation track TS of graduation T of a conventional scale M. In order to obtain integrated reference markings R, at evenly spaced intervals A of eight (n=8) graduation periods P, in each case an opaque region of graduation track TS is replaced by a transparent region. The P-periodicity of graduation track TS is therefore interrupted at regular intervals.

In the lower half of FIG. 2, detector D is shown schematically. Detector D includes a detector track DS having a plurality of sensors or photodetectors disposed one after the other in measuring direction X for scanning the image of graduation track TS.

If position values are formed in a conventional manner from the electrical signals of detector D, as explained above, the measured position deviates from the true position if scale M and detector D are not optimally aligned relative to each other. Such a deviation is illustrated qualitatively in FIG. 3. If the measuring error, e.g., deviation $\Delta X$, from the true position value is plotted against the shift X of scale M relative to detector D, a sawtooth function is obtained having a period that corresponds to interval A of the reference markings. This is easy to understand, since a scale M which is shifted by interval A passes exactly the same light pattern onto detector D as before it is shifted. The error resulting from the less than optimal imaging of the light pattern then assumes its initial value again, and the profile of the error curve repeats upon further shifting of scale M.

Figure 4:
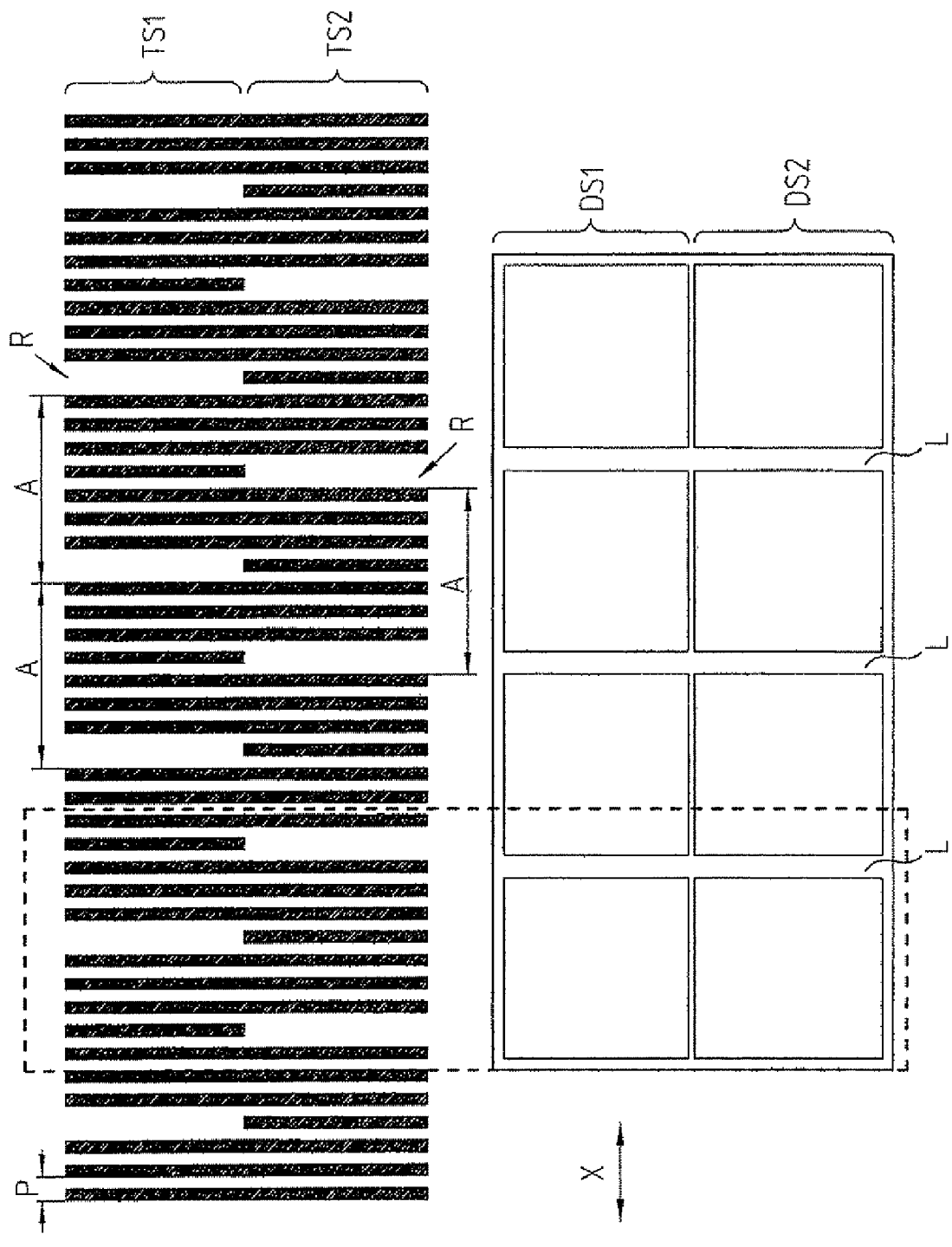
FIG. 4 schematically illustrates a scale with an associated detector field according to an example embodiment of the present invention.

The upper half of FIG. 4 illustrates a section of a graduation T of a scale M according to an example embodiment of the present invention. It can thus been seen that after each fourth period, there is an interruption of the P-periodicity. However, in each case, only half of an actually opaque region is replaced by a transparent region, and, e.g., the upper and the lower half in alternation. In other words, scale M has two P-periodic graduation tracks TS1, TS2, offset transversely (perpendicularly) with respect to measuring direction X, which bear reference markings R at evenly spaced intervals A. However, these reference markings R are staggered in measuring direction X, and, e.g., by half of interval A.

Figure 3:
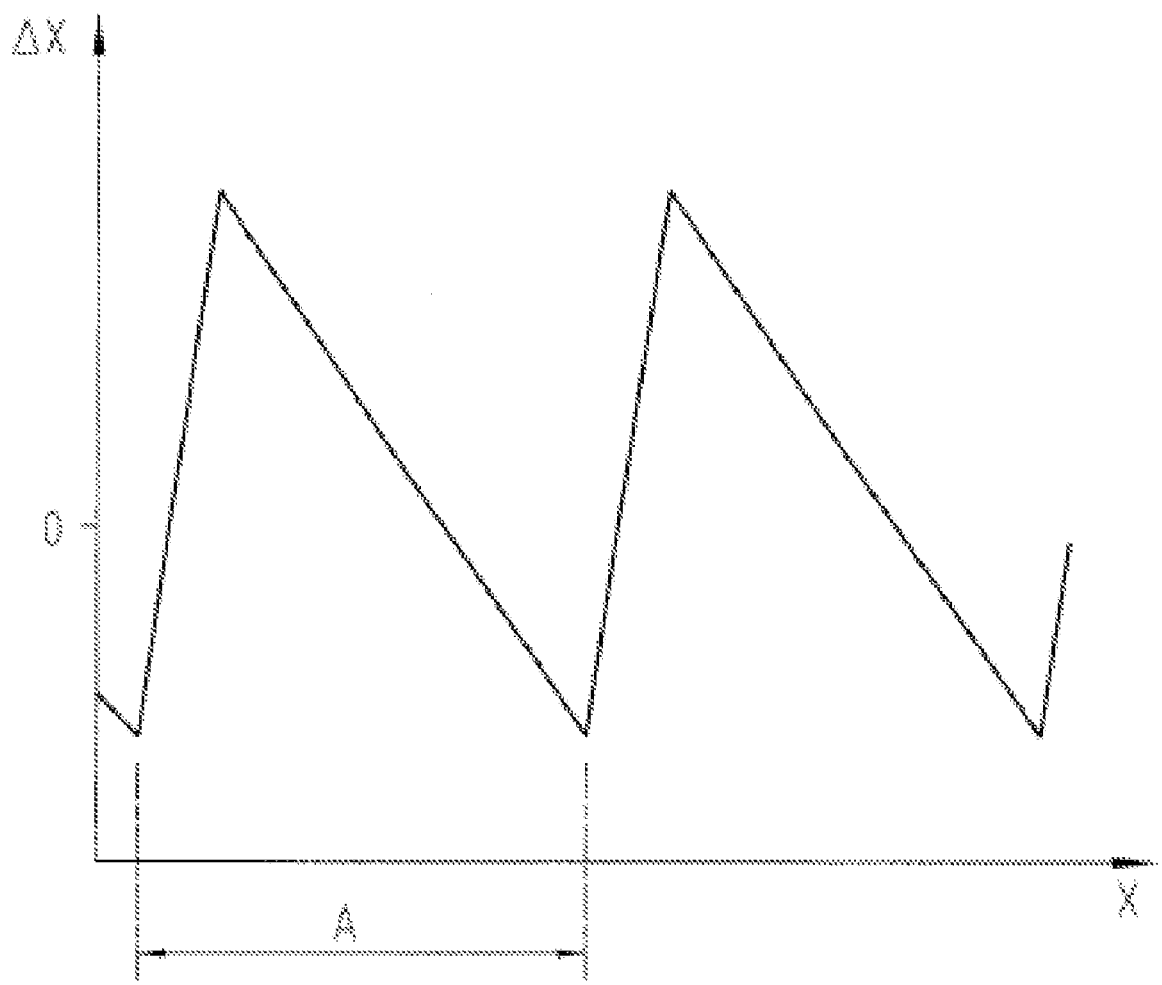
FIG. 3 shows a measuring error as a function of the measuring position according to a conventional arrangement.

If the two graduation tracks TS1, TS2 are evaluated by a detector D having two correspondingly arranged detector tracks DS1, DS2, position values are obtained whose measuring error appears as illustrated in FIG. 3. However, the two periodic measuring errors are shifted relatively to each other by their half period. Therefore, if the two position values obtained from graduation tracks TS1, TS2 are averaged, measuring error $\Delta X$ decreases markedly compared to conventional arrangements.

This effect of the decrease of measuring error $\Delta X$ may be improved considerably if it is provided that measuring error $\Delta X$ is not sawtooth-shaped as shown in FIG. 3, but rather sinusoidal, since two sinusoidal signals shifted by their half period cancel each other out particularly well.

Figure 5:
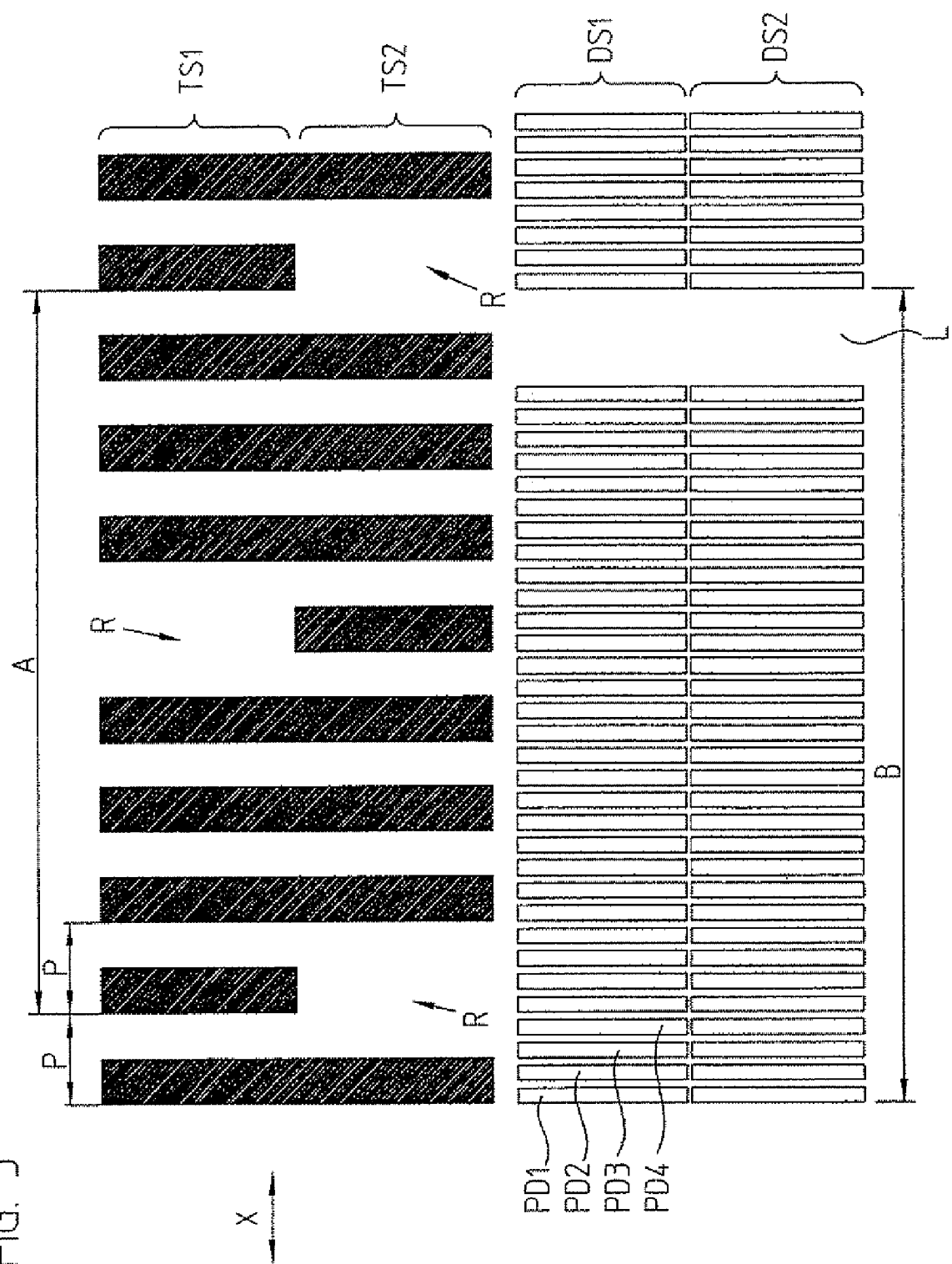
FIG. 5 is an enlarged view of the scale and associated detector field illustrated in FIG. 4.

A modification of detector tracks DS1, DS2 used for that purpose is illustrated in FIG. 4 by gaps L in detector tracks DS1, DS2. FIG. 5 is an enlarged view a section from FIG. 4, compressed transversely with respect to measuring direction X, based on which the details of detector tracks DS1, DS2 may be clarified.

Each period P of graduation tracks TS1, TS2 is scanned by four (m=4, other values where m>1 are also possible) sensors or photodetectors PD1, PD2, PD3, PD4. Therefore, every fourth sensor ideally detects the same phase. All in-phase sensors are electrically interconnected, so that one detector track supplies four periodic signals, out of phase by 90 degrees, for the shift detection. These four signals are usually combined to form two signals out of phase by 90 degrees to ascertain from this the shift according to absolute value and direction.

FIGS. 4 and 5 illustrates gaps L in detector tracks DS1, DS2, in which, in each instance, sensors PD1, PD2, PD3, PD4 are missing for one period P of graduation tracks TS1, TS2, By omitting sensors PD1, PD2, PD3, PD4 from the total width of one graduation period P, the desired rounding of the sawtooth profile of FIG. 3 is achieved. To that end, gaps L should occur with a different period than reference markings R. If, as in this exemplary embodiment, a reference marking R is present in each eighth period P of graduation tracks TS1, TS2, it presents itself to provide a gap L in each 9th period P of the detector tracks. Interval A of reference markings R and interval B of the gaps then differ by exactly one period P.

Gaps L of detector tracks DS1, DS2 do not necessarily have to be physically present on detector D. It is sufficient if the corresponding sensors are not electrically connected, or if their signals are simply not taken into consideration for forming position values. Gaps L differ from reference markings R in that the reference markings R must be present as visible deviation from the P-periodicity of graduation tracks TS1, TS2.

In comparison to reference markings R staggered in measuring direction X, gaps L of detector tracks DS1, DS2 are not staggered but are located side-by-side in measuring direction X.

For reliable detection and evaluation of reference markings R, in each case, sensors PD1 to PD4 from the two detector tracks DS1, DS2 are connected to each other, which are offset relative to each other by four periods P in the measuring direction. The output signal of such an arrangement may thus correspond to certain conventional arrangements and may be evaluated accordingly. However, to form a most error-free position value possible, the incremental signals from sensors PD1 to PD4, in each case arranged next to one another in measuring direction X, are utilized.

As indicated in FIGS. 4 and 5, one detector track DS1, DS2 may have three gaps L, for example, which in each case are surrounded on both sides by 32 (n*m=8*4) sensors PD1 to PD4. These respective 32 sensors PD1 to PD4 in each case cover eight (n=8) periods of graduation tracks TS1, TS2, so that a total of 135 periods P of graduation tracks TS1, TS2 are covered by detector tracks DS1, DS2, only 132 periods P being evaluated simultaneously because of the three gaps L.

It should be understood that scale M together with its graduation tracks TS1, TS2 may be considerably longer than illustrated in the figures.

In FIG. 5, photodetectors PD1 to PD4 are illustrated as rectangles. However, in order to filter unwanted harmonics, these photodetectors may also have other shapes, such as those described in German Published Patent Application No. 103 19 609 and U.S. Patent Application Publication No. 2004/0218190, each of which is expressly incorporated herein in its entirety by reference thereto. In particular, adjacent photodetectors PD1 to PD4 may be disposed so that a shared line of contact forms an angle with measuring direction X unequal to 90 degrees, and/or photodetectors PD1 to PD4 may have curved boundary lines in the area of their longitudinal ends. For this, reference is made in particular to FIG. 2 of German Published Patent Application No. 103 19 609 and U.S. Patent Application Publication No. 2004/0218190. Photodetectors 34.1 to 34.4 of FIG. 2 of German Published Patent Application No. 103 19 609 and U.S. Patent Application Publication No. 2004/0218190 correspond to photodetectors PD1 to PD4 of FIG. 5 hereof.

Scale M may be a transmitted-light scale having transparent and opaque regions, or an incident-light scale having reflecting and absorbing regions. In both cases, sensors PD1 to PD4 of detector tracks DS1, D52 are photodetectors.

For reasons of better representability, a reference marking R is indicated in the Figures by replacement of a dark region by a light region. However, the opposite case, e.g., the replacement of a light region by a dark region is considered to be preferred. Additional dark regions merely reduce the signal available by one eighth (for n=8). Moreover, additional light regions may produce additional scattered light and therefore may impair the degree of modulation and thus the signal quality.

In addition to position-measuring devices based on optical scanning, other systems based on the scanning of periodic scales are also possible, e.g., having capacitive, inductive or magnetic graduation structures and corresponding sensors for their scanning, etc.

Scales having (as exemplarily described above) two or more graduation tracks offset transversely with respect to measuring direction X are possible. A corresponding number of detector tracks are necessary. The elimination of measuring errors within one track by evaluation of several tracks may thus possibly succeed even somewhat better. However, the additional expenditure and the benefit attainable should be taken into consideration in this regard.

An underlying principle of a scale and a position-measuring device hereof, is the shifting of the reference markings in the graduation tracks, offset transversely with respect to the measuring direction, by fractions of the interval of the reference markings within a graduation track. A possibility is thus provided to eliminate, or at least to markedly reduce, negative effects of the disturbance of the periodicity of a graduation track by the reference markings.

What is claimed is:

1. A position-measuring device, comprising:
   a scale including at least two graduation tracks, each track being P-periodic in a measuring direction and including an integrated reference marking in the form of an interruption of the P-periodicity at evenly spaced first intervals, the graduation tracks being offset transversely with respect to the measuring direction, and the integrated reference markings being staggered in the measuring direction; and
   a patterned detector configured to scan the scale to generate electrical signals to form a position value, the detector including a plurality of detector tracks configured to scan the graduation tracks, the detector tracks being offset transversely to the measuring direction, each detector track, for a plurality of periods of the graduation tracks, including a plurality of m sensors per period arranged one after another in the measuring direction.

2. The position-measuring device according to claim 1, wherein, transversely to the measuring direction, the scale includes two P-periodic graduation tracks having reference markings staggered by half of the first interval in the measuring direction.

3. The position-measuring device according to claim 1, wherein the graduation tracks include light and dark regions alternating in the measuring direction, each period formed by one light region and one dark region, each nth light or dark region in each graduation track being replaced by an opposite dark or light region to form an integrated reference marking.

4. The position-measuring device according to claim 3, wherein n=8 and the first interval corresponds to an eightfold of the period.

5. The position-measuring device according to claim 1, wherein the graduation tracks include light and dark regions alternating in the measuring direction, each period formed by one light region and one dark region, each eighth light or dark region in each graduation track being replaced by an opposite dark or light region to form an integrated reference marking, the first interval corresponding to an eightfold of the period.

6. The position-measuring device according to claim 1, wherein, at a second interval different from the first interval, each detector track has a gap in which, in each case, m sensors are one of (a) missing and (b) not utilized to generate the electrical signals.

7. The position-measuring device according to claim 6, wherein the first interval and the second interval differ by one period.

8. The position-measuring device according to claim 6, wherein the gaps of the detector tracks are arranged next to one another.

9. The position-measuring device according to claim 1, wherein the sensors include photodetectors, each group of four photodetectors arranged one after another in the measuring direction is arranged to scan one period of a graduation track.

10. The position-measuring device according to claim 1, wherein light from a light source, after being collimated, passes through the scale onto the patterned detector.

11. The position-measuring device according to claim 10, wherein the sensors include photodetectors; and
wherein photodetectors arranged adjacent each other are interconnected to detect the graduation tracks, and photodetectors arranged offset relative to each other in the measuring direction are interconnected to detect the integrated reference markings, the offset of the photodetectors corresponding to the offset of the integrated reference markings between the graduation tracks.

12. The position-measuring device according to claim 1, further comprising a light source and a collimator configured to collimate light from the light source and direct the collimate light through the scale on the patterned detector.

13. The position-measuring device according to claim 1, wherein m=4.

* * * * *